United States Patent [19]
Hedlund

[11] 3,988,038
[45] Oct. 26, 1976

[54] UNIVERSAL WHEEL SYSTEM
[75] Inventor: Raymond J. Hedlund, Benicia, Calif.
[73] Assignee: FDI, Inc., Cleveland, Ohio
[22] Filed: July 14, 1975
[21] Appl. No.: 595,357

[52] U.S. Cl. .......................................... 301/9 DN
[51] Int. Cl.² ........................................ B06B 3/16
[58] Field of Search .......... 301/9 DN, 9 AN, 5 D, 301/36, 65, 111, 63 R

[56] References Cited
UNITED STATES PATENTS

| 3,749,450 | 7/1973 | Senter | 301/9 DN |
| 3,779,610 | 12/1973 | Pansky | 301/9 DN |

*Primary Examiner*—Stanley H. Tollberg
*Attorney, Agent, or Firm*—Alter and Weiss

[57] ABSTRACT

A universal wheel system which will accomodate a variety of lug bolt configuration radii described by a series of lug bolts extending from a vehicle's standard brake drum and hub assembly thus enabling attachment of the wheel and an associated tire.

9 Claims, 10 Drawing Figures

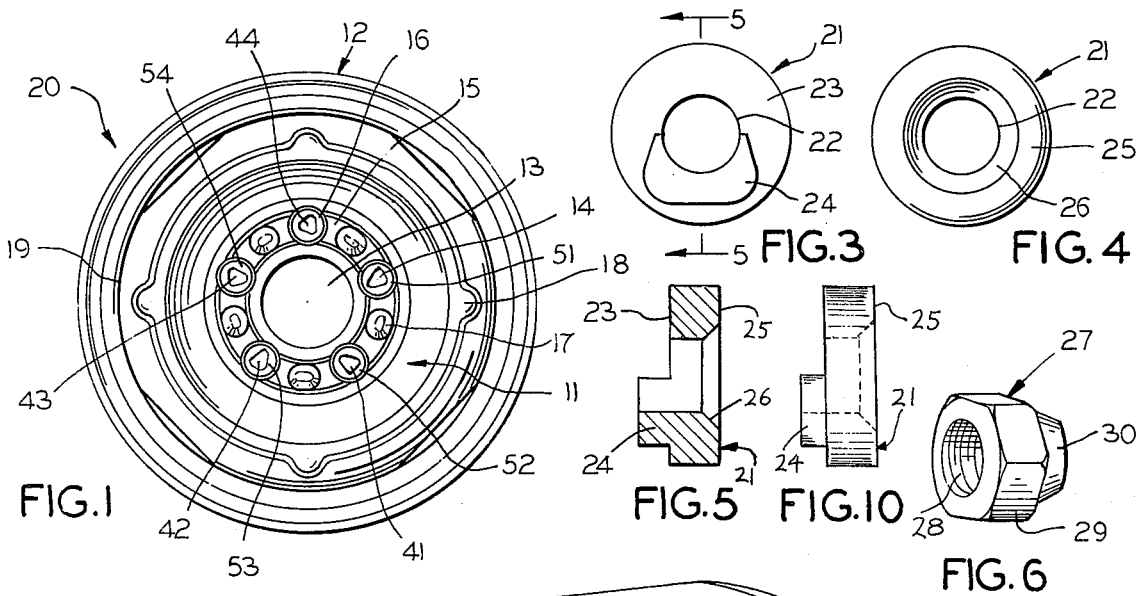
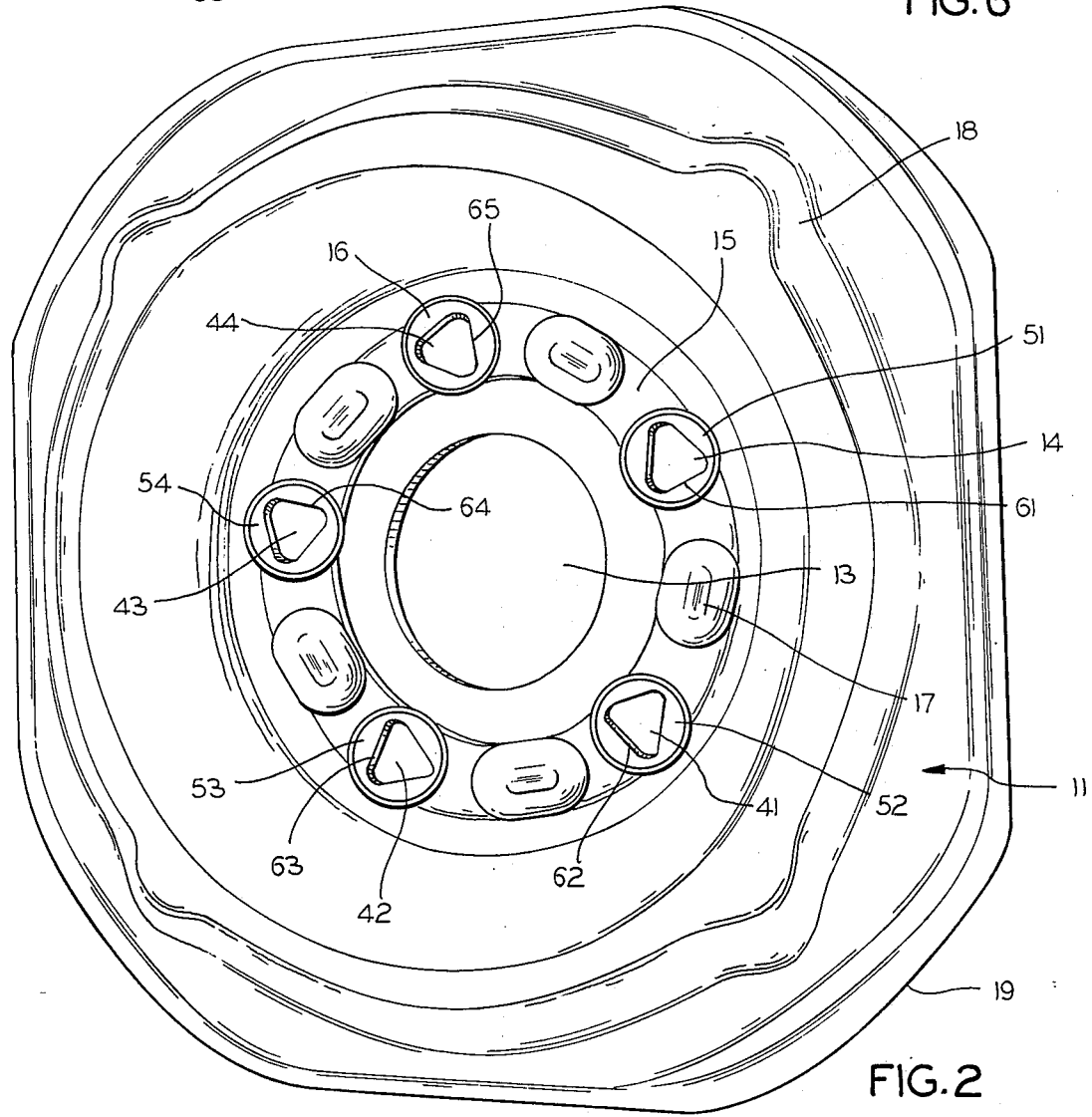

U.S. Patent  Oct. 26, 1976  Sheet 2 of 2  3,988,038
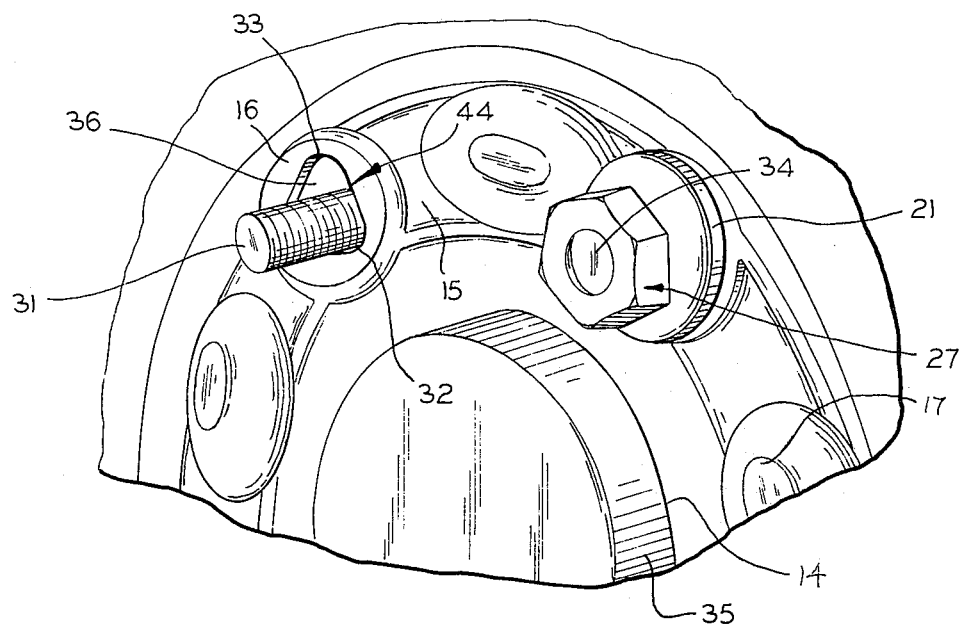
FIG. 7
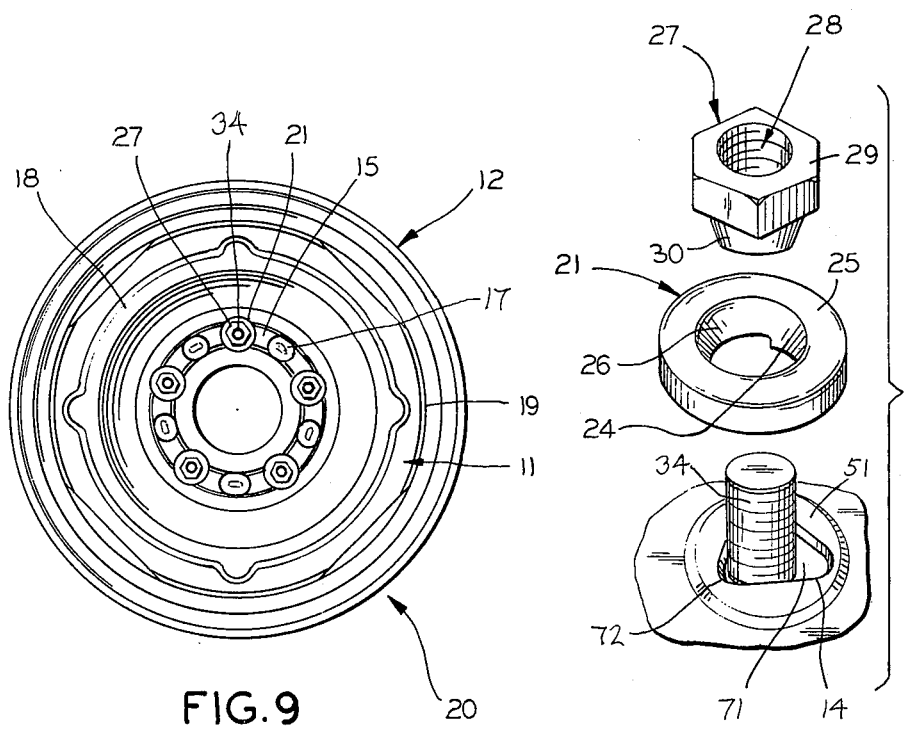
FIG. 9
FIG. 8

UNIVERSAL WHEEL SYSTEM

BACKGROUND OF THE INVENTION

The present invention relates generally to motor vehicular wheel structures, and more particularly to a universal wheel system which will allow installation of the wheel and an attached tire to a vehicle regardless of the vehicle's lug bolt configuration radius.

With the advent of increased motor vehicle usage and the ownership by many families of more than one vehicle, it has become increasingly important to provide for interchangeability of tire-bearing wheel systems from one vehicle to another. Additionally, with more and more drivers utilizing replaceable tire systems on their vehicles, such as separate sets of snow tires, separate sets of racing tires, and the like, the need for a universal, interchangeable tire has been further reinforced. With the many forms of improved and often expensive tire products now on the market, the use of a universal wheel system would allow the transfer of a set of usable tires to a second vehicle with a different lug bolt configuration radius.

Most of the problems inherent with the interchangeability of wheels from one car to another car stem from the use by the major vehicle manufacturers of three different lug bolt configuration radii. The largest automotive manufacturer in the United States, for example, utilizes a lug bolt radius of 5 inches on most of its standard-sized cars while most of its intermediate-sized automobiles utilize a lug bolt radius of 4¾ inches. The conventional wheel sold as standard factory equipment on almost all vehicles, and its associated tire, can only be used on a vehicle having that exact lug bolt configuration radius. Any attempt to transfer the wheel with or without an attached tire would be futile if the car to which this wheel assembly was being transferred has an altogether different lug bolt configuration radius. In fact, the same exact model of one automobile in 1 year may not coincide with the lug bolt radius configuration of that same model as manufactured in the following year.

It becomes apparent for the reasons set forth above, that a universally transferable steel "standard equipment type" wheel would offer much convenience in terms of seasonal wheel changes as well as transfers of one set of tires and wheels to another or successive vehicle.

While interchangeability between different lug bolt configuration radii is of prime importance and is one of several objectives the present invention attempts to secure, the manner in which this universality is obtained, as well as the mechanical and structural soundness of the universal system are also of extreme importance. The universal wheel should provide for its user the same degree of strength and structural rigidity to keep the wheel, and the tire mounted therewith, in place, as does the present, non-universal wheel provided by the manufacturer when the vehicle is purchased. It must similarly be capable of maintaining this strength and rigidity under various, and sometimes demanding, torque applications exerted during severe acceleration and braking conditions.

Along with its universal design and strong construction such a universal wheel must also provide installation means which make its use practical. A vehicle manufacturer and wheel user would refrain from adopting a universal wheel concept which proves to be difficult, time-consuming to install, or which would require an unreasonable amount of locating, positioning, and securing to the drum apparatus from which the lug bolts protrude.

In recent years, there have been several developments in the area of universal wheel system devices. One such device is set forth in the Adair patent, U.S. Pat. No. 2,590,363. The device utilizes a series of slotted openings radiating outwardly from the center of the wheel through which the lug bolts can protrude for final fastening by nut fastening devices. The Adair wheel provides a plurality of these openings to fit the wheel to a four, five, or six bolt configuration in which the radii of any of the bolt configurations can range significantly. While the Adair device substantially discloses a concept offering a universal wheel device to accommodate different bolt number and bolt radius configurations, a design of the type disclosed by Adair, for the most part, fails to incorporate elements to achieve strength under torque, since the bolts are not restrained in place mechanically other than by the nuts fastening them. Nor does the Adair wheel substantially provide a method of locating, positioning, and securing the lug bolts on the wheel. Most devices incorporating the Adair design attempt to achieve universal axial alignment no matter the particular combination of lug aperture configurations by insuring that each lug bolt, no matter what the overall configuration, projects through a given aperture proximate at least one side of the aperture. Washers are then placed over the protruding big bolts, and lug nuts are used to lock the wheel in position. Some of the apertures have countersunk designs to assist in restraining the wheel in place. The resulting installation provides a non-positive locking arrangement which can be susceptible to loosening, since the washers do not fill the unused portion of the slots, and do not brace the lug bolt. Additionally, each of the lug nuts can possibly bear unevenly on the wheel causing potential unbalancing when the wheel is in movement.

Another universal type wheel is disclosed in the Vachon patent, U.S. Pat. No. 3,166,357. Instead of incorporating longitudinal slotted orifices radially extending from the center of the hub portion of the universal wheel, the Vachon device utilizes a series of circular orifices patterned to accept several configurations, over which an alignment plate is placed before final securement to the vehicle's drum from which the lug bolts protrude. The Vachon wheel, which relates primarily to custom wheels, utilizes this alignment plate, or annular plate as it is sometimes called, to provide the universal feature for the wheel by fitting the plate to a particular lug bolt configuration. However, as with many of the wheels of the previously discussed Adair design, the Vachon wheel can be prone to considerable structural weakness since the use of many orifices, defining lug bolt configurations in the wheel, removes metal from the wheel. Too, the Vachon wheel can be difficult to locate, position, and secure to the vehicle's drum, especially in light of the need to simultaneously secure the annular plate while installing the wheel. Additionally, manufacturing a wheel with as many as 15 orifices drilled or stamped into it, together with the required annular plate that must be fitted to the particular vehicle lug bolt configuration radius on which it is to be installed, makes the Vachon type wheel somewhat prohibitive in cost while limiting the true universality of the Vachon wheel.

Another universal wheel is disclosed in the Beith patent, U.S. Pat. No. 3,329,468. Beith discloses a vehicular wheel structure which is also universally applicable to vehicles regardless of their wheel lug bolt configuration radii. Beith teaches the use of shaped lug apertures accommodating any one of a series of different lug bolt configuration radii. In order to accommodate the lug bolts in 4½ inch, 4¾ inch, and 5 inch configuration radii, Beith utilizes two sets of adaptors which fit into a seated region proximately surrounding an elongated slotted aperture. One set of adaptors has a circular lug bolt hole towards one end of its oval shape which would fit the 4½ inch and 5 inch radii lug bolt configurations depending on which end of the aperture the circular hole end was placed. The elongated oval-shaped adaptor in many respects acts as a positive indexing device. As an example, when the adaptors are correctly in place, the lug bolt holes in the adaptors accurately correspond to the positions of lug bolts arranged in a 5 inch configuration radius. The lug bolt thus extends through the circular hole in the disk-shaped adpator which is further restrained in place within the seated or counter-sunk portion of the wheel immediately surrounding the slotted oval lug aperture. If the wheels were to be used with a 4½ inch configuration radius, the hub bolt would be indexed by Beith's adaptor when the oval-shaped adaptor is reversed in position from that used for the 5 inch configuration. Further, the adaptor is restrained in place into the seated portion of the wheel, and since locked into position further restrains the hub bolt positively in place, allowing final fastening through the use of a lug bolt nut.

A separate second type of adaptor device is needed for use in one embodiment of the Beith device for a third configuration radius. This adaptor has a circular hole fabricated at its center to, in similar fashion, encircle the protruding lug bolt of a 4¾ inch radius lug bolt configuration. This second type of adaptor, having a hole directly in the center for the intermediate range of 4¾ inch is, similarly, locked into position by insertion into the seated portion surrounding the lug bolt aperture and further allows, in a comparable manner, the final attachment of the wheel to the vehicle's lug bolts and wheel drum by use of wheel lug bolt nuts.

It should be appreciated that Beith discloses one of the earlier prior art devices which utilizes a positive locking system, thus reinforcing the strength and wear characteristics of the wheel with relation to the wheel drum and protruding lug bolts. Beith basically discloses a universal wheel utilizing a positive locking system and a series of adaptors reinforcing this system, strengthening the wheel and making it a practicality.

An alternative to these prior art universal wheel devices is offered in the form of the present invention which offers several advantages over the prior art inventions.

In most of the examined prior art, few of the devices address themselves to the facilitated locating, positioning, and securement of the universal wheel to a vehicle's lug bolts. On the Vachon and Adair wheels, for example, the determination of which orifices or slots respectively, to be used when installing the wheel on the vehicle must often be based on trial and error or guesswork. Additionally, after the proper orifices on the Vachon wheel have been selected and inserted over the protruding lug bolts, the proper size annular plate must be attached onto the wheel before it can be bolted by fastening devices into a secure fit. With the Adair wheel, as previously mentioned, the selection of the proper radiating slots does not necessarily guarantee proper alignment of the center of the wheel with the vehicle's axle center, thus causing misalignment and wheel balancing problems. Further, with the Adair wheel, the wheel is restrained only by a minimal amount of contact provided by each lug as it meets with the straight sides of each aperture. The entire lug is not completely surrounded or maintained in place by metal positioned within the slots but is rather restrained in place by minimal spot face contact and the additional friction force exerted on it by securing nut fastening devices.

The Beith patent also discloses a series of geometrically shaped devices which can be utilized as alternatives to the substantially ovate longitudinal shape as adaptor-washer devices. As an example, Beith's triangularly-shaped adaptor can be reoriented in a triangularly-shaped seat without requiring two separate sets of adaptors to accommodate three different lug bolt configuration radii. But, in all of the Beith disclosures, the inserted portion through which positive locking is attained will totally encircle the protruding lug bolt. Beith additionally discloses the possibility of not using any adaptor inserts at all, but rather suggests that the space between the protruding lug bolt and the encompassing lug aperture be occupied by a space-filling bolt. The feasibility of such a suggestion could still present problems in positioning, locating and securing the wheel, which are aided by the present invention. Additionally, the use of the Beith seating regions on stamped steel wheels can present problems since the thickness of a stamped steel wheel does not lend itself properly to the fabrication of a seating region and the costs involved with manufacturing such a seated region on a standardly used steel wheel could be prohibitive.

It is thus an object of the present invention to provide an alternative universal wheel system applicable to any type of wheel, including stamped steel wheels which provides a positive locking system with inherent strength characteristics to lock each individual protruding lug bolt in place.

Additionally, it is an object of the present invention to provide for a vehicle manufacturer and a vehicle user a universal wheel system utilizing a minimum of adaptor-type locking means by requiring only one type for use on any lug bolt configuration.

It is also an object to provide ease for a vehicle manufacturer and vehicle user in locating, positioning, and securing the wheel by making it unnecessary for a locking insert device to completely surround the protruding lug bolt.

Further, it is an object of the present invention to reduce the cost of manufacturing a universal steel wheel by eliminating any need for seating areas around any of the lug apertures so as to enable the present invention to be offered as standard equipment on mass-produced vehicles.

Also, it is an object of the present invention to provide a universal wheel system which makes unnecessary the use of large annular locking devices and special ancilliary locking equipment which can be different for each type of lug bolt configuration.

Finally, it is an object of the present invention to provide a universal wheel system usable as is furnished with a vehicle, allowing interchangeability of the already available wheel to any other vehicle of different lug bolt configuration radii.

SUMMARY OF THE INVENTION

The present invention is a universal wheel system for use on vehicles, which is capable of being installed onto a vehicle having any one of three distinct lug bolt configuration radii. The wheel itself has a hub portion which is attached juxtaposed to the hub drum of a vehicle as well as a tire attachment portion on which a tubeless or tubed conventional tire may be mounted.

In the hub portion of the present invention, are located a plurality of triangularly shaped orifices, each radiating an equal distance from the center of the hub portion of the wheel at a constant recurring angular displacement around the hub portion of the wheel. The triangularly shaped orifices enable the insertion of the lug bolts protruding outwardly from the vehicle's wheel drum. While a substantially triangularly shaped orifice is described in detail in one embodiment, it can be seen that the use of several different geometric orifice means could be utilized towards the same result.

In utilizing a triangularly shaped orifice, the present invention has the capability of being installed on any one of three separate configuration radii. If, for example, a 4½-inch radii lug bolt configuration is present on the vehicle, the corners of the triangularly shaped orifices which are closest to the center of the hub portion of the wheel would make possible the insertion of these lug bolts into these particular corners. Additionally, the corners of the triangularly shaped orifice farthest from the center of the wheel are positioned so as to enable the insertion of lug bolts in a 5-inch configuration radius through each of the respective corners. Finally, if the vehicle onto which the wheel and tire will be installed has a 4¾-inch lug bolt configuration radius, the center portion of the triangularly shaped orifices, at a position between that of the closest corner and the farthest corner, would provide means through which the 4¾-inch dispersed bolts could be inserted. The centrally disposed corner of the triangularly shaped orifice is the corner in which the 4¾-inch dispersed lug bolt is secured.

It should similarly be noted that the triangularly shaped orifices themselves, each approaching the shape of an equilateral triangle, do not, in fact, have sharp angular corners. They have, instead, substantially rounded corners having approximately the same radius of curvature as the radius of curvature of each of the lug bolts themselves. This affords the outer periphery of the orifice and thus a portion of the wheel itself to proximately wrap around a substantial portion of the inserted lug bolt which will eventually be positively locked into one of the rounded corners.

In one embodiment of the present invention, the hub portion through which the wheel system attains its capability of fitting several different lug bolt configuration radii wheels, is attached to the tire attachment means portion through the welding of the two together. Additionally, in this particular embodiment, both the hub portion and the tire attachment portion are comprised of stamped steel, though virtually any type of wheel fabrication can utilize the present invention. Further, fabricated ridges are positioned onto the steel wheel, primarily for purposes of structural reinforcement and supportive restraint so as to more effectively lock the lug bolt into a portion of the geometrically shaped orifice.

A plurality of locking insert means are positioned around the protruding lug bolts in the geometrically shaped orifices. The locking insert means are metallic adaptor bushing disks each having a protusion aperture through its center which is countersunk on one side and flat on the opposite side, except for a protruding locking appendage which emanates from this second side and which is proximate to the protrusion aperture. The locking appendages are shaped to fill the space of the triangularly shaped orifice left unoccupied when a lug bolt is passed therethrough, and to closely surround and restrain the lug bolt located in one of the corners of the triangularly shaped orifice. The locking appendage co-operates with a corner of the geometrically shaped orifice to describe a circular lug bolt aperture proximately surrounding and securing the lug bolt into position within the geometrically shaped orifice. Nut fastening means are then attached over the remainder of the protruding lug bolt so as to secure the locking insert means into place whereby each lug bolt, its respective locking insert and triangularly shaped orifice, are fastened into a fixed, spatiial relationship with each other.

BRIEF DESCRIPTION OF THE DRAWINGS

FIG. 1 is a front elevational view of the universal wheel showing the hub portion before it is installed onto a vehicle;

FIG. 2 is a side perspective view of the hub portion of the universal wheel;

FIG. 3 is a rear elevational view of the locking insert device particularly showing the protruding locking appendage emanating from the rear side of said locking insert device;

FIG. 4 is a front elevational view of the locking insert device showing with particularity the counter-sunk adaptor bushing disk portion;

FIG. 5 is a cross sectional view of the locking insert device with its protruding locking appendage, taken along 5—5 of FIG. 3 and looking in the direction of the arrows;

FIG. 6 is a side perspective view of the invention's nut fastening device;

FIG. 7 is a side perspective view of the universal wheel as installed onto a vehicle with a lug bolt of said vehicle protruding through the invention's geometrically shaped orifice;

FIG. 8 is a top perspective exploded view of a portion of the present invention showing the invention's geometrically shaped orifice, a protruding lug bolt through said orifice, the locking insert device, and the nut fastening device depicting the manner in which installation of the invention is obtained;

FIG. 9 is a front elevational view of the universal wheel invention as installed and secured onto a vehicle; and FIG. 10 is a side elevational view of the locking insert device with its protruding locking appendage.

DETAILED DESCRIPTION

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

The universal wheel 20 is shown in FIG. 1 as the wheel itself would look before installation onto a vehicle's wheel drum. Tire attachment means 12 which permits the mounting of a conventional tire to the wheel assembly is connected to hub portion 11 to form a unitized wheel through a series of welds exemplified by weld 19. Within hub portion 11 the wheel's mounting apparatus is shown enabling attachment of the wheel with a mounted tire, to a vehicle's hub drum and lug bolts. When installed, the vehicle's lug bolts will protrude through a plurality of geometrically shaped orifices 14, 41, 42, 43 and 44. The vehicle's axle hub will additionally protrude through the wheel's hub aperture 13. Also shown in FIG. 1 is raised concentric shoulder ridge 15, which circles the hub portion so as to intersect the positions of the geometrically shaped orifices 14, 41, 42, 43, and 44. Concentric shoulder ridge 15 imparts additional depth to said geometrically shaped orifices for additional reinforcement to restrain a protruding lug bolt in place within the orifice and to structurally reinforce the hub portion of the universal wheel invention for improved strength. The geometrically shaped orifices, 14, 41, 42, 43, and 44 which in this embodiment are substantially triangularly shaped with rounded corners, have lug bolt restraining ridges 51, 52, 53, 54, and 16 surrounding the periphery of each respectively. Lug bolt restraining ridges 51, 52, 53, 54, and 16 reinforce the outer edge of each respective geometrically shaped orifice towards restraining each lug bolt which will be secured in place within the orifice. A plurality of inter-orifice mounds as exemplified by inter-orifice mound 17, are concentrically placed about the center of the hub portion of the invention so as to be juxtaposed onto concentric shoulder ridge 15, between each successive geometrically shaped orifice, for increased reinforcement of the hub portion of the universal wheel invention. Further, the universal wheel invention utilizes a hub portion boundary reinforcement ridge 18 which protrudes outwardly from the periphery of the wheel's hub portion towards the position of the tire attachment means 12, so as to reinforce the structural strength of hub portion 11 which is integrally formed into a single unit with tire attachment portion 12.

An enlargement of hub portion 11 of the universal wheel invention is shown in perspective in FIG. 2. Triangularly shaped orifices 14, 41, 42, 43, and 44 are shown radiating an equal distance from the center of the hub portion of the universal wheel at a constant recurring angular displacement around the hub portion 11. Additionally, each of the triangularly shaped orifices 14, 41, 42, 43, and 44 have identical geometric placement in the hub portion of the universal wheel invention relative to the center of hub portion 11 such that a line connecting the center of the hub portion with the center of the triangularly shaped orifice will be parallel to one of the three sides 61, 62, 63, 64, and 65 respectively, of each respective triangularly shaped orifice. Raised concentric shoulder ridge 15 intersects the positions of the geometrically shaped orifices 14, 41, 42, 43, and 44. Additionally, lug bolt restraining ridges 51, 52, 53, 54, and 16 surround and reinforce the periphery of each geometrically shaped orifice respectively. Typical inter-orifice mount 17 which is positioned on concentric shoulder ridge 15 between orifices 14 and 41, exemplifies the use of the plurality of inter-orifice mounds which furnish reinforcement to the hub portion of the universal wheel invention.

The back side of the locking insert device 21 is shown in FIG. 3 having formed therein protrusion aperture 22, flat second side of bushing disk 23, and protruding locking appendage 24. It can be seen from the shape of protruding locking appendage 24 that when locking appendage 24 is inserted into any one of the triangularly shaped orifices, it serves to surround and secure a lug bolt into one of the rounded corners of the triangularly shaped orifice itself.

A front view of the locking insert device 21 is shown in FIG. 5 more clearly, displaying first side 25, second side 23, countersunk portion 26, and protruding locking appendage 24. Similarly, a side elevational view of the locking insert device 21 is shown in FIG. 10 with locking appendage 24 and first side 25.

Nut fastening device 27 is shown in FIG. 6 having open end 28 displaying the threading of the nut device, nut turning portion 29 and tapered end 30 which fits into counter-sunk portion 26 of the locking insert device 21 as shown in FIG. 4.

A perspective view showing the manner in which universality is obtained by the wheel invention is shown in FIG. 7. Depending on the lug bolt configuration radius, lug bolt 31 would be capable of fitting into any one of the three corners of triangularly shaped orifice 44. Thus, if lug bolt 31 was positioned on a 4½-inch radius from the center of the vehicle's wheel drum, it would fit into corner 32, the most inwardly positioned corner of the triangularly shaped orifice on the universal wheel invention. If lug bolt 31 was positioned on a 5-inch radius, it would fit into corner 33 of the triangularly shaped orifice and, similarly, if it was located on a 4¾-inch radius, it would fit into the intermediate displaced corner of the triangularly shaped orifice, not shown. All three corners of the triangularly shaped orifice are fabricated with a radius of curvature closely approximating that of lug bolt 31 itself. Thus, any of the three corners in this particular embodiment would be capable of closely surrounding a substantial portion of protruding lug bolt 31, allowing a portion of the wheel itself to restrain the lug bolt in place. However, no matter which corner lug bolt 31 would occupy, there would be an unoccupied portion of space still available within the triangularly shaped orifice which is defined by the other two unoccupied corners. In FIG. 7 it can also be seen that unoccupied space 36 formed by unoccupied corner 33 and the intermediate corner not shown, surrounds lug bolt 31 positioned in occupied corner 32. Unoccupied space 36 allows the insertion of similarly shaped protruding appendage 24 shown in FIG. 3, which in turn positively restrains lug bolt 31 into its corner position 32.

Additionally shown in FIG. 7 is lug bolt restraining ridge 16 which surrounds triangularly shaped orifice 44 and reinforces the restraint of lug bolt 31 within triangularly shaped orifice 44. Further, raised concentric shoulder ridge 15, and interorifice mound 17 both provide increased reinforcement and additional metal thickness, improving overall structural strength on the positive locking system of the universal wheel invention. The vehicle's axle hub 35 is shown protruding through axle hub aperture 14.

The positive locking and securement of lug bolt 34 is also shown in FIG. 7 with nut fastening device 27 securely restraining locking insert device 21 in place.

The exploded view shown in FIG. 8 illustrates the arrangement of the triangularly shaped orifice 14, lug bolt 34, locking insert device 21, and nut fastening device 27 as they are used to positively restrain the universal wheel invention onto the vehicle's wheel drum. The positioning of locking insert device 21 relative to lug bolt 34 and protruding locking appendage 24 into space 71 securely positions lug bolt 34 into corner 72 where protruding appendage 24 and orifice corner 72 rigidly restrain lug bolt 34 in place. Lug bolt restraining ridge 51 around the periphery of triangularly shaped orifice 14 further reinforces the periphery of orifice 14 to improve structural restraint of lug bolt 34 between locking appendage 24 and corner 32. After locking insert device 21 is positioned in triangularly shaped orifice 14 with lug bolt 34, the tapered end 30 of nut fastening device 27 is tightened over locking insert device 21 to fit into counter-sunk portion 26 on the insert's first side 25. Thus, the nut fastening device 27 rigidly restrains locking insert device 21 in place, further restraining lug bolt 34 in place within corner 72 of triangularly shaped orifice 14.

The universal wheel system after installation is illustrated in FIG. 9. Typical welding location 19 integrates hub portion 11 and tire attachment portion 12 into a unitary wheel system 20. As can be seen, each lug bolt such as lug bolt 34 is restrained in place within the triangularly shaped orifices, not shown, by a plurality of locking insert devices such as locking insert device 21, which is further restrained in place by a plurality of nut fastening devices such as nut fastening device 27. Additionally, restraining ridges 15, 17, and 18 further reinforce the structural strength of the universal wheel invention together with the lug bolt restraining ridges which cannot be seen in FIG. 9 since they are covered by the plurality of locking insert devices.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A universal wheel system for use on vehicles comprising:
   wheel means having a hub portion and tire attachment means, said wheel means having in said hub portion a plurality of geometrically shaped orifice means, each having corners through which threaded lug bolts of a vehicle can protrude,
   said corners of each said geometrically shaped orifice means corresponding to lug bolt patterns having at least three different radii,
   each of said geometrically shaped orifice means radiating an equal distance from the center of said hub portion of said wheel means at a constant recurring angular displacement around said hub portion of said wheel means,
   a plurality of locking insert means, each co-operating with a protruding lug bolt so as to locate and secure said lug bolt within said geometrically shaped orifice means when disposed about said lug bolt;
   said locking insert means co-operating with said corners of said geometrically shaped orifices so as to describe lug bolt apertures through which said lug bolts protrude whereby a portion of the periphery of each said lug bolt aperture is formed by said locking insert means and the remainder of said periphery of each said lug bolt aperture is formed by said corner of each said geometrically shaped orifice, and
   nut fastening means which secure said locking insert means into place whereby said lug bolt, said locking insert, and said orifice means are fastened into a fixed spatial relationship with one another.

2. The invention according to claim 1 in which said geometrically shaped orifice means comprise substantially triangularly shaped orifice means,
   said triangularly shaped orifice means having rounded corners,
   said rounded corners having substantially the same radius of curvature as said lug bolts whereby said rounded corners are disposed about the periphery of said lug bolts in a closely proximate fashion, and
   each of said triangularly shaped orifices having geometric placement in said hub portion of said steel wheel means relative to said center of said hub portion such that a line connecting said center of said hub portion and the center of each said triangularly shaped orifice is parallel to one of the three sides of said triangularly shaped orifice.

3. A universal wheel system for use on vehicles comprising:
   wheel means having a hub portion and tire attachment means, said wheel means having in said hub portion a plurality of geometrically shaped orifice means, each having corners through which threaded lug bolts of a vehicle can protrude,
   said corners of each geometrically shaped orifice means corresponding to lug bolt patterns having at least two different radii,
   said geometrically shaped orifice means radiating an equal distance from the center of said hub portion of said wheel means at a constant recurring angular displacement around said hub portion of said wheel means;
   a plurality of locking insert means, each cooperating with a protruding lug bolt so as to locate and secure said lug bolt within said geometrically shaped orifice means when disposed about said lug bolt;
   said locking insert means comprising a metallic adaptor bushing disk having a protrusion aperture through its center,
   said protrusion aperture being counter-sunk on the first side of said adaptor bushing disk,
   said adaptor bushing disk having on its second side a protruding locking appendage proximate to said protrusion aperture which partially occupies said geometrically shaped orifice while said lug bolt protrudes through said geometrically shaped orifice,
   said protruding locking appendage filling the open portion of said geometrically shaped orifice adjacent to said protruding lug bolt whereby said protruding lug bolt is securely braced by said protruding locking appendage within said geometrically shaped orifice with said protruding lug bolt protruding through said protrusion aperture in said metallic adaptor bushing disk,
   said protruding locking appendage being selectively positionable to accommodate one of at least two said different lug bolt radii,
   said locking insert means co-operating with said corners of said geometrically shaped orifices so as to describe lug bolt apertures through which said lug bolts protrude whereby a portion of the periphery of each said lug bolt aperture is formed by said locking insert means and the remainder of said periphery of each said lug bolt aperture is formed by said corner of each said geometrically shaped orifice; and nut fastening means which secure said locking insert means into place whereby said lug bolt, said locking insert, and said orifice means are fastened into a fixed spatial relationship with one another.

4. The invention according to claim 3 in which said nut fastening means comprises:

a plurality of threaded nuts having a first end which is closed and a second end which is tapered, each of said nuts inserted onto each of said protruding threaded lug bolts respectively with said tapered second end of said nut fitting into said counter-sunk portion of said protrusion aperture in each said metallic adaptor bushing disk whereby said locking insert means is restrained in place securely positioning each said protruding threaded lug bolt within said wheel means.

5. The invention according to claim 1 in which said universal wheel system further comprises:

a raised concentric shoulder ridge within said wheel hub portion of said wheel, said concentric shoulder ridge circling said hub portion so as to intersect the positions of said geometrically shaped orifices whereby additional depth is imparted to said orifices for additional reinforcement to restrain one said lug bolt in place within each said orifice and whereby structural reinforcement is imparted to said hub portion of said wheel means for improved strength.

6. The invention according to claim 1 in which said universal wheel system further comprises:

lug bolt restraining ridges around the periphery of each said geometrically shaped orifice whereby reinforcement is provided towards the secure restraint of said lug bolt in said orifice by said locking insert means.

7. The invention according to claim 1 in which said universal wheel system further comprises:

inter-orifice mounds concentrically placed about the center of said hub portion so as to be situated on said concentric shoulder ridge between each successive orifice means whereby increased reinforcement is imparted to said hub portion of said wheel means.

8. The invention according to claim 1 in which said universal wheel system further comprises:

a hub portion boundary reinforcement ridge protruding outwardly from the peripheral edge of said hub portion towards the location of said tire attachment means of said wheel means whereby said hub portion of said steel wheel means is reinforcedly integrated with said tire attachment means to form said wheel means.

9. A method for installing a universal wheel which can be mounted onto a vehicle's hub drum via said vehicle's lug bolts, and accommodate three or more lug bolt configuration radii through the utilization of geometrically shaped orifices and locking insert means having locking appendages, comprising the steps of:

a. aligning each of said wheel's geometrically shaped orifices with one of said lug bolts, b. pushing said wheel over said lug bolts so as to cause said lug bolts to protrude through said geometrically shaped orifices whereby said wheel can suspend independently from said lug bolts and whereby said wheel is positioned over said vehicle's hub drum, c. placing one of said locking insert means over each said protruding lug bolt with each said locking insert means locking appendage aligned with the space in each said orifice which it will occupy, d. pushing said locking appendage on said insert means into the aligned portion of said orifice whereby said locking appendage automatically urges each said protruding lug bolt into a corner of said orifice in which said lug bolt is restrained in position by the corner periphery of each said orifice and the inner periphery of each said locking appendage, and e. securely fastening nut fastening means over each said locking insert means so as to restrain the position of said locking insert means, said lug bolt, and said geometrically shaped orifice in fixed spatial relationship.

* * * * *